March 2, 1943.  S. GRANJON  2,312,402

STARTER FOR INTERNAL COMBUSTION ENGINES

Filed March 4, 1941

INVENTOR.
Stéphane Granjon

Patented Mar. 2, 1943

2,312,402

UNITED STATES PATENT OFFICE 2,312,402

STARTER FOR INTERNAL COMBUSTION ENGINES

Stephane Granjon, Saint Etienne, France, assignor to Bendix Aviation Corporation, South Bend, Ind., a corporation of Delaware Application March 4, 1941, Serial No. 381,747
In France March 5, 1940

2 Claims. (Cl. 74—7)

The invention relates to starters for internal combustion engines and more particularly to mechanisms establishing and interrupting automatically a connection between a starting motor and a member of an engine to be started.

It has for an object an arrangement of this kind which may be of simple and strong construction and such that the overhang of the motor shaft may be reduced in large measure in order to eliminate the liability of breakage of this shaft.

The invention contemplates more particularly starting devices where the driving member such as a pinion is connected to the motor shaft by a threaded connection, the relative displacement of the elements of this connection controlling the meshing of the pinion with the member of the engine to be started, then, after meshing is accomplished, the compression of an elastic system in such a manner as to create in this connection a frictional effect sufficient to permit the transmission of torque. It is remarkable principally in that the elastic system is seated in the interior of the casing of the motor which serves as a bearing for the motor shaft, the system being compressed by the prolongation of or by an element rigid with one of the elements of the threaded connection.

Figure 1:
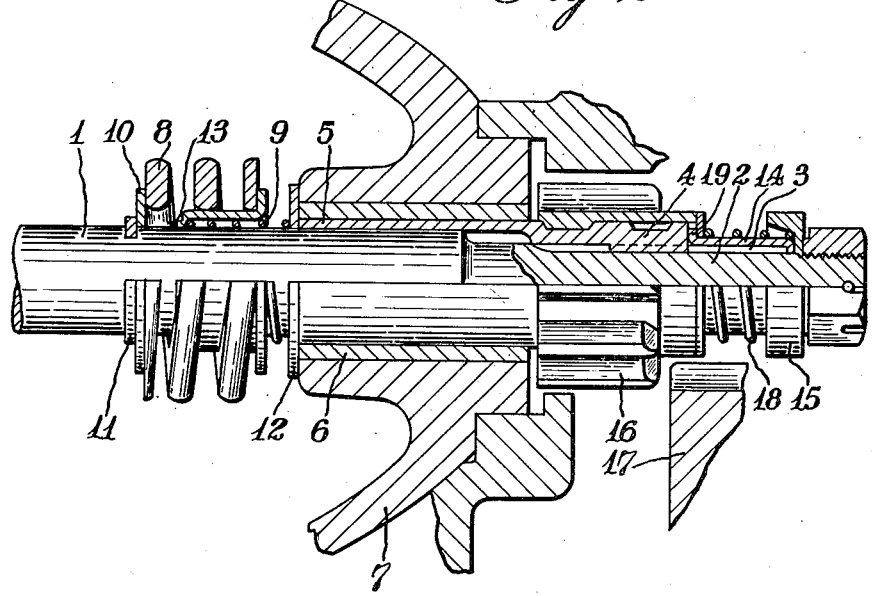
Figure 2:
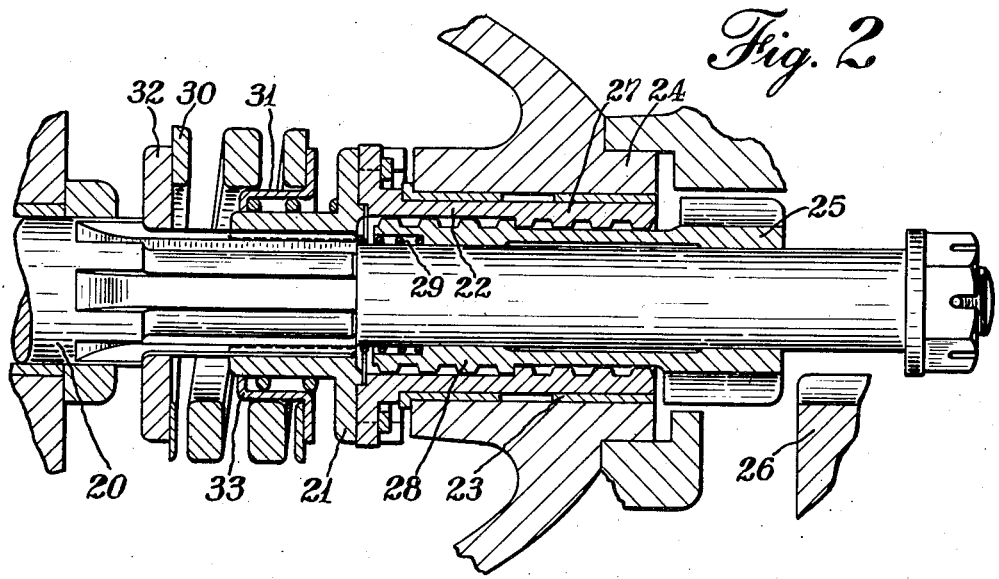

The invention will now be described with reference to the drawing, where Figures 1 and 2 represent partial elevations in section of two preferable modes of realization of the invention, the elements being found in the positions of rest.

Referring first to Figure 1, numeral 1 designates a motor shaft which may be the prolongation of the armature shaft of the starting motor. This shaft comprises a part 2 of reduced diameter which is splined as indicated at 3.

A driving element 4 constituted by an exteriorly threaded sleeve is provided interiorly with splines which cooperate with those of the motor shaft so as to permit axial displacement of the sleeve with respect to the shaft while rendering these two elements rigid in respect to rotation. The sleeve comprises a cylindrical prolongation 5 directed toward the starting motor, the interior diameter of which is equal to that of the part of larger diameter of the motor shaft. This prolongation 5 bears, on the other hand, in a bearing mounted in a recess of an element 7 of the casing.

In the interior of the starter casing there are mounted a strong spring 8 and a small spring 9 which surround the motor shaft, telescoping one in the other. One of the ends of the spring 8 bears against a washer which abuts against a ring 11 rigid with the motor shaft, and one of the ends of the small spring 9 bears against a washer 12 which is mounted on the motor shaft and abuts against the extremity of the prolongation 5 of the threaded sleeve. The other ends of the springs 8 and 9 bear respectively on the rim and the base of a coupling thimble 13 interposed between the two springs which are thus mounted in series. It will be noted that the two springs are shorter than the distance comprised between the two washers. The washer 12 bears against the rim of the coupling thimble 13 after a certain compression of the small spring 9 in such manner that the final displacement of the washer determines the compression of the spring 8.

An abutment is provided for the sleeve 4 and consists of a collar 14 which is mounted on the extremity of the shaft and bears at one of its ends against the sleeve and at the other end against an abutment 15 mounted on the motor shaft.

The driving member is constituted by a pinion 16 threaded on the sleeve 4 and arranged to engage with a member of the engine to be started such as the toothed ring 17 of the flywheel.

The position of rest of the pinion is defined by a spring 18, one extremity of which bears against the fixed abutment 15 and the other extremity against a washer 19 which bears against a prolongation of the pinion.

Thanks to the mounting of the pinion and of the springs on both sides of the casing of the starter, the overhang of the motor shaft is reduced to a minimum and thus the danger of rupture of the shaft is diminished. Moreover, the prolongation of the threaded sleeve supports the shaft and prevents it from flexing.

The operation of the starting device is as follows:

The rotation of the motor shaft 1 controls the screwing of the pinion on the threaded sleeve 4 to come into engagement with the toothed ring 17 of the flywheel of the engine to be started, this movement terminating when the washer 19 comes to bear against the abutment 15. When this engagement is completed, the sleeve 4 moves backward compressing first the spring 9, then, when the washer 12 comes into contact with the coupling thimble 13, the spring 8. When the compression of the spring 8 is sufficient to oppose the movement of the sleeve, the pinion 16 is caused to turn the member 17 of the engine and brings about the starting of the internal combustion engine.

When the engine starts, the pinion 16 is accelerated with respect to the threaded sleeve 4 and unscrews, disengaging from the engine member.

If in the course of the meshing operation the teeth of the pinion abut against those of the toothed ring, the threaded sleeve moves backward compressing the spring 9 until the friction in the threaded connection becomes sufficient to turn the pinion and lead it into correct position for engagement with the member of the engine to be started.

In Figure 2, a collar 21 is mounted by splines formed on the motor shaft 20 in such manner as to permit sliding on this shaft. The collar 21 is rigid with a sleeve 22 threaded on a portion of its length, the remaining part being smooth. The sleeve 22 is mounted in a bearing 23 which is provided in the interior of a recess formed in a part of the casing 24 of the starter.

A pinion 25 arranged to come into engagement with a member of the engine to be started such as the toothed ring 26 of the flywheel, is mounted with slight friction on a part of reduced diameter of the motor shaft and comprises a prolongation 27 which rests on the said part by virtue of a bearing 28 formed in the interior of the pinion prolongation. A thread arranged to cooperate with the thread of the sleeve 22 is provided on the extremity of the pinion prolongation, and the threads of the sleeve 22 and of the prolongation of the pinion are normally disengaged, a spring 29 assuring the engagement at the start of rotation of these threads. The spring 29 is seated in the annular cavity constituted at the rear of the bearing 28 between the prolongation of the pinion and the motor shaft and bears at one of its ends against the shoulder constituted by the extremity of the splined part of the motor shaft and at the other end against the bearing 28.

Two springs 30 and 31 are mounted on the interior of the casing of the starter and surround the motor shaft. The spring 30, which is of great strength, bears at one of its ends against a washer 32 which abuts against a shoulder of the motor shaft, and at its other end against the rim of a coupling thimble 33 of which the bottom has an opening of the diameter of the collar 21 so as to slide on the latter. The spring 31, which is of slight strength, bears at one of its extremities against the base of the coupling thimble and at its other extremity against a flange formed on the end of the collar 21. It is thus seen that the two springs are, as in the embodiment of Figure 1, mounted in series.

The mode of operation of this device is the same as that of Figure 1. If the motor shaft is rotated, the collar 21 turns with it and drives the sleeve 22. By virtue of the action of the spring 29 which brings about the initial engagement of the threads of the sleeve 22 and of the prolongation of the pinion, the pinion is displaced along the motor shaft to come into mesh with the toothed ring 26. When the engagement is completed, the sleeve 22 moves back and compresses the spring 31 until the flange of the collar 21 comes to bear against the rim of the coupling thimble 33, then the spring 30. This movement continues until the compression of the spring 30 becomes such that the friction which is created in the threaded connection constituted by the sleeve 22 and the prolongation of the pinion, is sufficient to assure the transmission of torque.

The spring 31 plays the same role as the spring 9 in order to assure the correct engagement of the pinion when the teeth of the latter abut against the teeth of the flywheel ring.

When the internal combustion engine starts, the pinion and its prolongation are accelerated with respect to the sleeve 22, and accordingly the pinion unscrews from the sleeve until the threads of the two elements are completely disengaged. The pinion and its prolongation then turns freely until their momentum is dissipated.

The advantages of this embodiment are analogous to those of the arrangement shown in Figure 1, except for the diminution of the overhang and reenforcement of the shaft by the threaded sleeve.

Although only two embodiments of the invention have been described and shown in detail, it is understood that there are others and that modifications may be made in the form and arrangement of the elements without departing from the field of the invention.

What is claimed is:

1. In an engine starter drive a casing, a hollow shaft slidably journalled therein having a threaded portion projecting from the casing, a power shaft journalled in the hollow shaft having a portion of reduced diameter splined in the threaded portion of the hollow shaft and extending there-beyond, a pinion threaded on the hollow shaft for movement into and out of engagement with a member of an engine to be started, yielding abutment means for the hollow shaft on the power shaft within the casing, and fixed abutment means on the reduced extension of the power shaft defining the idle position of the hollow shaft and the operative position of the pinion.

2. An engine starter drive as set forth in claim 1 including, further, yielding means on the extended portion of the power shaft for holding the pinion in idle position, and said yielding abutment including a weak spring and a strong spring and means whereby the initial displacement of the hollow shaft is opposed by the weak spring only, further displacement being opposed directly by the strong spring.

STEPHANE GRANJON.